(12) United States Patent
Takamori et al.

(10) Patent No.: US 8,264,617 B2
(45) Date of Patent: Sep. 11, 2012

(54) ANALOG TV BROADCAST SIGNAL RECEIVING APPARATUS AND ANALOG TV BROADCAST SIGNAL DEMODULATING APPARATUS

(75) Inventors: Tsutomu Takamori, Tokyo (JP);
Toshihisa Hyakudai, Chiba (JP);
Nobuaki Tsuchiya, Tokyo (JP); Gerd Spalink, Stuttgart (DE)

(73) Assignee: Sony Corporation, Tokyo (JP)

( * ) Notice: Subject to any disclaimer, the term of this patent is extended or adjusted under 35 U.S.C. 154(b) by 750 days.

(21) Appl. No.: 12/413,908

(22) Filed: Mar. 30, 2009

(65) Prior Publication Data

US 2009/0244384 A1 Oct. 1, 2009

(30) Foreign Application Priority Data

Mar. 31, 2008 (JP) ................................ P2008-089574
Jul. 30, 2008 (JP) ................................ P2008-195921

(51) Int. Cl.
*H04N 5/455* (2006.01)

(52) U.S. Cl. ........ 348/726; 348/572; 348/731; 348/738; 348/735; 348/E05.113

(58) Field of Classification Search .................. None
See application file for complete search history.

(56) References Cited

U.S. PATENT DOCUMENTS

2004/0223086 A1 11/2004 Jaffe
2007/0070882 A1* 3/2007 Kawauchi et al. ............ 370/210
2008/0129886 A1* 6/2008 Ishihara ........................ 348/731

FOREIGN PATENT DOCUMENTS

| DE | 44 44 870 | 10/1995 |
|---|---|---|
| EP | 0 683 608 | 11/1995 |
| EP | 1 395 048 | 3/2004 |
| EP | 1 635 560 | 3/2006 |
| EP | 1 657 917 | 5/2006 |
| JP | 11 88789 | 3/1999 |
| JP | 11 196348 | 7/1999 |
| JP | 2000 91936 | 3/2000 |
| JP | 2003 318760 | 11/2003 |
| JP | 2006 174424 | 6/2006 |
| JP | 2006 191388 | 7/2006 |
| JP | 2007 519365 | 7/2007 |
| WO | WO 2005 081519 | 9/2005 |

* cited by examiner

*Primary Examiner* — Jefferey Harold
*Assistant Examiner* — Omer Khalid
(74) *Attorney, Agent, or Firm* — Frommer Lawrence & Haug LLP; William S. Frommer; Thomas F. Presson

(57) ABSTRACT

Disclosed herein is an analog television broadcast signal receiving apparatus including: a tuner section configured to convert an analog television broadcast signal into a predetermined intermediate frequency band signal; a demodulation circuit section configured to obtain a picture output signal and a sound intermediate frequency signal from the predetermined intermediate frequency band signal coming from the tuner section; a picture processing circuit section configured to convert the picture output signal into a display-ready picture signal; a sound demodulation processing circuit section configured to demodulate the sound intermediate frequency signal; and a control section.

3 Claims, 10 Drawing Sheets

F I G. 1
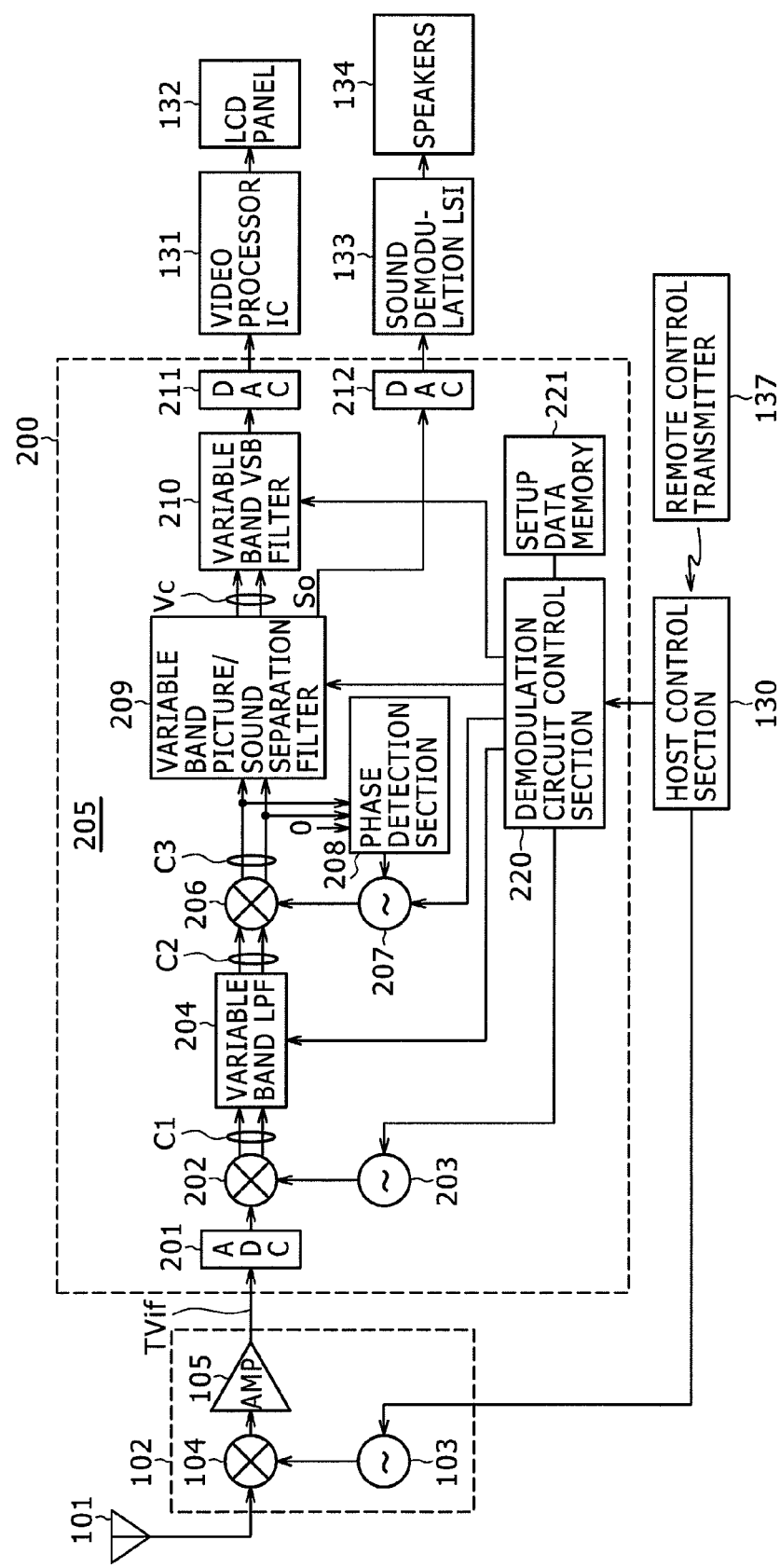

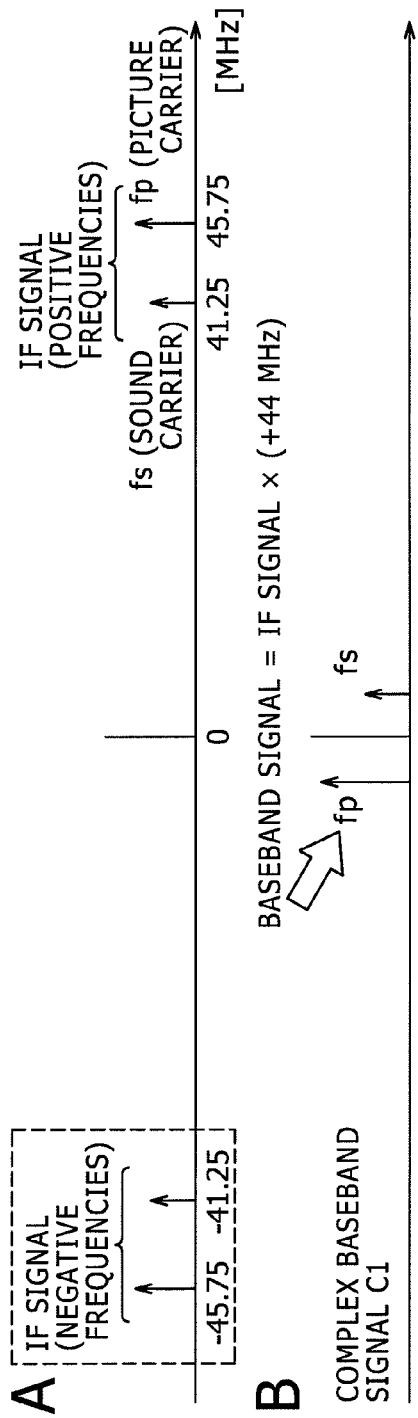
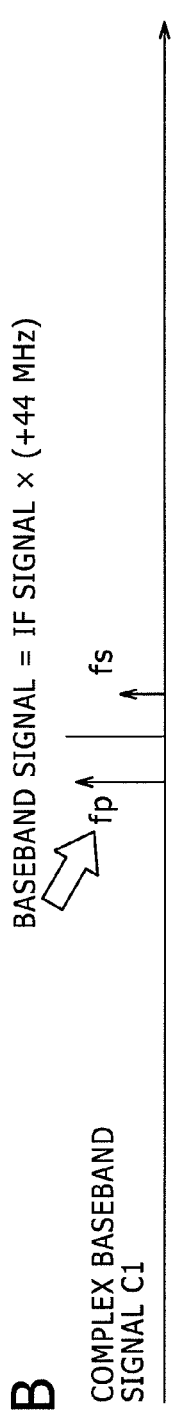
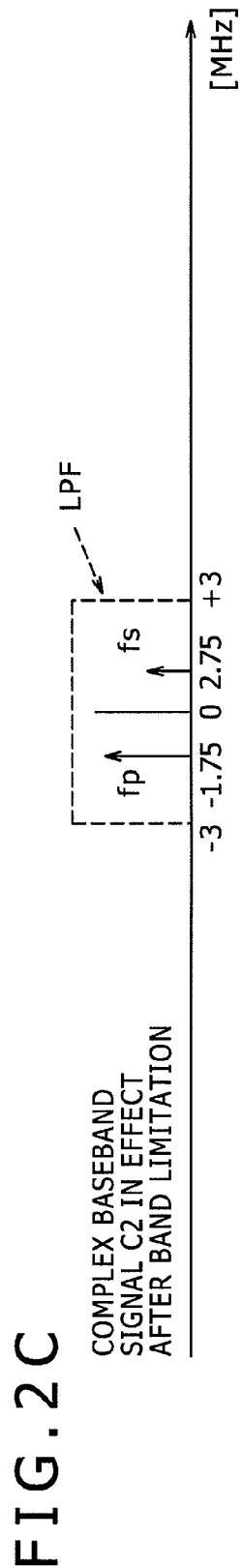
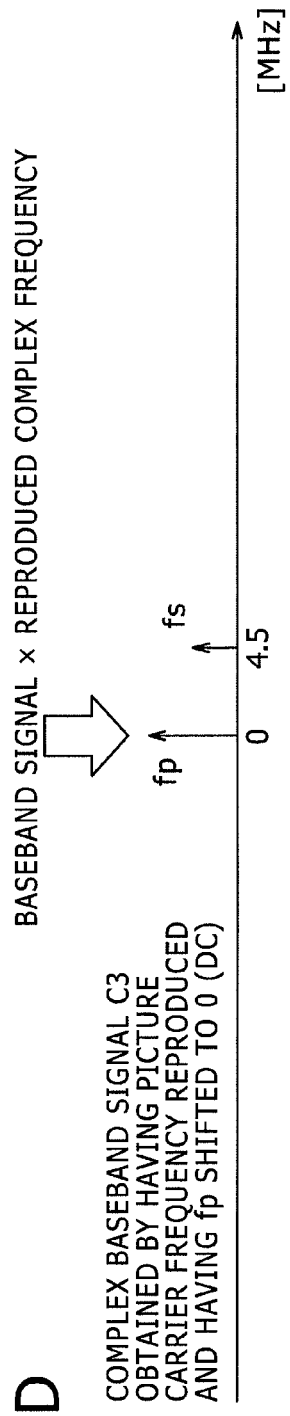

COMPLEX BASEBAND SIGNAL C3

OUTPUT C4 OF MULTIPLIER 401, GIVEN WHEN FREQUENCY IS SHIFTED BY -4.5 MHz

OUTPUT C5 OF LPF 403, GIVEN WHEN PICTURE SIGNAL IS REMOVED BY LPF

OUTPUT So OF MULTIPLIER 404, GIVEN WHEN FREQUENCY IS SHIFTED BY +4.5 MHz

OUTPUT Vc OF SUBTRACTOR, GIVEN WHEN OUTPUT OF CURCUIT 404 IS SUBTRACTED FROM OUTPUT OF CIRCUIT 406

| ANALOG SIGNAL BANDWIDTHS | | [MHz] | 6 | 7 | 8 | L' |
|---|---|---|---|---|---|---|
| P1 | BASEBAND CONVERSION FREQUENCY | [MHz] | +44 | +36.65 | +36.15 | -35.45 |
| P2 | VARIABLE BANDWIDTH OF LPF 204 FOR BAND LIMITATION | [MHz] | ±3 | ±3.5 | ±4 | ±4 |
| P3 | SOUND CARRIER FREQUENCY CONVERSION | [MHz] | -4.5 | -5.5 | -6.5 | -6.5 |
| P4 | VARIABLE BANDWIDTH OF LPF 403 FOR SOUND SEPARATION | [kHz] | ±250 | ±250 | ±250 | ±250 |
| P5 | BAND LIMITATION OF VSB FILTER 210 | [MHz] | 4.2 | 5 | 6 | 6 |

ORDINARY EUROPEAN IF SIGNAL

CASE OF L'

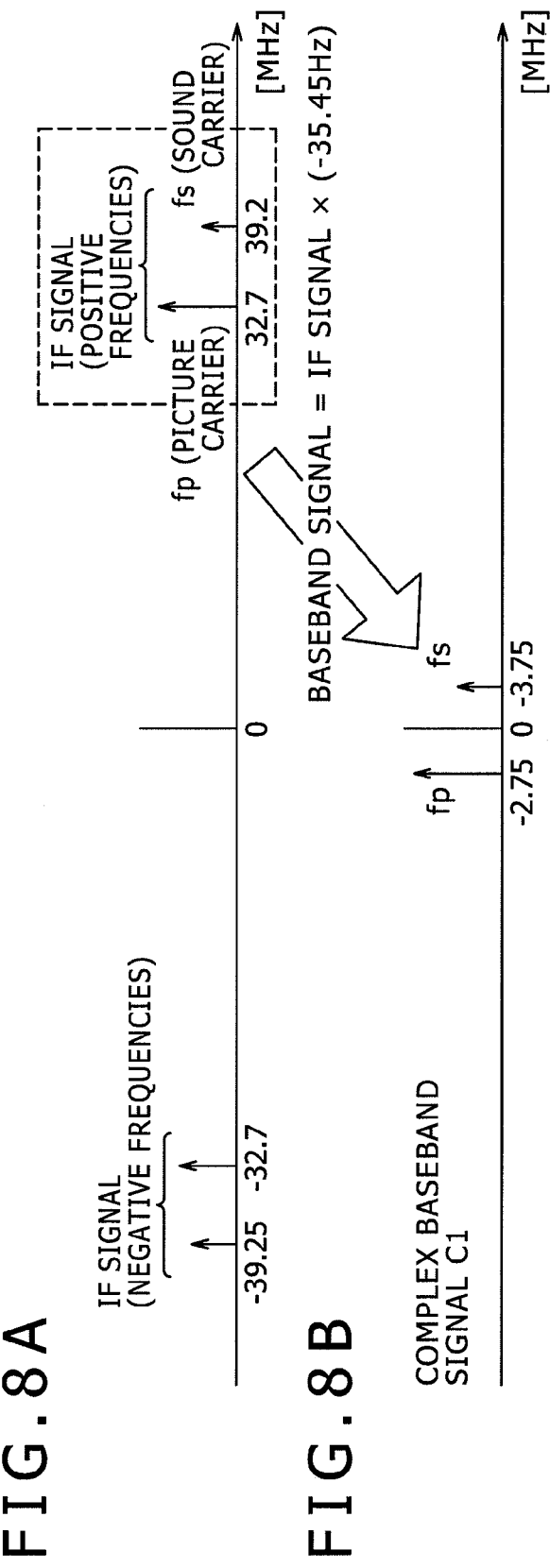

RELATED ART

ANALOG TV BROADCAST SIGNAL RECEIVING APPARATUS AND ANALOG TV BROADCAST SIGNAL DEMODULATING APPARATUS

BACKGROUND OF THE INVENTION

1. Field of the Invention

The present invention relates to an analog TV (television) broadcast signal receiving apparatus and an analog TV broadcast signal demodulating apparatus for use therewith, the analog TV broadcast signal receiving apparatus being designed illustratively to deal with diverse analog TV broadcasts used all over the world.

2. Description of the Related Art

A number of analog TV broadcast systems exist throughout the world. They differ from one another in terms of broadcast bandwidths and in frequency assignments of the picture and sound carriers involved. More specifically, there are three principal broadcast bandwidths: 6 (4.2) MHz, 7 (5) MHz, and 8 (6) MHz (the numbers in parentheses denote picture signal bandwidths).

The 6 MHz band is the broadcast band for the analog TV system used mainly in the United States. The 7/8 MHz band is the broadcast band for the analog TV system employed primarily in the European Union (Europe).

On ordinary broadcast bands (RF bands), the sound carrier is assigned a higher frequency than the picture carrier. In Germany, for example, Channel 2 has its picture and sound carrier frequencies appropriated at 48.25 MHz and 53.75 MHz, respectively.

In some regions of France, however, the picture carrier is assigned a higher frequency than the sound carrier. For example, the station called Channel A has its picture and sound carrier frequencies appropriated at 47.75 MHz and 41.25 MHz, respectively.

Except for the different frequency assignments of its picture and sound carriers, however, the above-mentioned French analog TV broadcast system has the same picture signal bandwidth and the same frequency interval between the picture and the sound carriers as the analog TV broadcast systems in the other regions. The channel of which the picture signal is assigned a higher frequency than the sound carrier is commonly referred to as Channel L'.

There have been attempts to devise analog TV broadcast signal receiving apparatuses capable of demodulating the TV signals of all the analog TV broadcast systems outlined above. Generally, these analog TV broadcast signal receiving apparatuses have their filters arranged to limit the picture and sound signal bands on the IF (intermediate frequency) band for each of the broadcast bandwidths involved, and are each furnished with mechanisms to switch between such band limitation filters.

More specifically, the vestigial sideband (VSB) filter for limiting the picture signal band and the band limitation filter for limiting the sound signal band are switched in keeping with the picture and sound carriers on each broadcast band. Generally, surface acoustic wave (SAW) filters are used to serve as the VSB filter for limiting the picture signal band and as the filter for limiting the sound signal.

FIG. 9 schematically shows a typical structure of an ordinary analog TV broadcast signal receiving apparatus designed for use in the United States and in the European Union. In FIG. 9, an analog TV broadcast signal received by a receiving antenna 101 is shown forwarded to an RF tuner 102. In the RF tuner 102, the received analog TV broadcast signal (i.e., RF signal) is converted in frequency to an IF signal TVif by a mixer 104 using a frequency signal coming from a variable frequency oscillator 103. The IF signal TVif is output by the RF tuner 102 by way of an amplifier 105.

FIGS. 10A, 10B and 10C schematically show how the IF signal TVif behaves on the 6, 7, and 8 MHz bands, respectively. FIG. 10A indicates the IF signal on the 6 MHz band used mainly in the United Sates. FIG. 10B represents the IF signal on the 7 MHz band employed primarily in Europe. FIG. 10C denotes the IF signal on the 8 MHz band utilized also in Europe. As shown in these figures, the IF signal differs from one band to another. That means each IF signal needs to have the appropriate SAW filter selected for use therewith.

The SAW filter selection is accomplished by first feeding the IF signal TVif from the RF tuner 102 to VSB filters (SAW filters) 106 and 107 for picture signal use and to sound selection SAW filters 108 and 109 for sound signal use. The VSB filter 106 is a SAW filter for use on the 6 MHz band (4.2 MHz for the picture signal band); the VSB filter 107 is a SAW filter used on the 7/8 MHz band (5/6 MHz for the picture signal band); the sound selection SAW filter 108 is utilized on the 6 MHz band; and the sound selection SAW filter 109 is employed on the 7/8 MHz band.

The outputs of the VSB filters 106 and 107 are supplied to a selector 110. The outputs of the sound selection SAW filters 108 and 109 are fed to a selector 111. The selectors 110 and 111 are controlled selectively by a host control section 130 providing overall control on the receiving apparatus as a whole.

The host control section 130 is composed of a microcomputer typically called a TV microcomputer. For each of the different markets (e.g., U.S., Europe) for which the receiving apparatus is destined, destination-oriented settings are registered in the host control section 130.

The host control section 130 receives user operation input information from a remote control transmitter 137. The user operation input information includes broadcast channel selection operation information. Upon receipt of the broadcast channel selection operation information from the remote control transmitter 137, the host control section 130 generates a selection control signal reflecting the destination-oriented setting information that has been registered inside and forwards the generated selection control signal to the variable frequency oscillator 103. In turn, the TV broadcast signal of the selected broadcast channel is converted to the corresponding IF signal TVif.

The host control section 130 also supplies the selectors 110 and 111 with selection signals in keeping with the destination-oriented setting information that has been registered in this receiving apparatus. Illustratively, if the receiving apparatus is set to receive the analog TV broadcast signal in the United States, then the microcomputer 130 causes the selector 110 to select the VSB filter 106 for the 6 MHz band. Similarly, if the receiving apparatus is arranged to receive the analog TV broadcast signal in the European Union, then the microcomputer 130 causes the selector 110 to select the VSB filter 107 for the 7/8 MHz band. The selector 110 outputs a picture IF signal Vif having undergone VSB demodulation.

Meanwhile, each sound signal requires that the applicable SAW filter be used to remove the picture signal from the IF signal TVif. For example, if the receiving apparatus is set to receive the analog TV broadcast signal on the 6 MHz band, the microcomputer 130 causes the selector 110 to select the sound selection SAW filter 108 for the 6 MHz band so as to remove the picture signal. Likewise, if the receiving apparatus is designed to receive the analog TV broadcast signal on the 7/8 MHz band, then the microcomputer 130 causes the selector 110 to select the sound selection SAW filter 109 for the 7/8 MHz band in order to eliminate the picture signal.

The picture IF signal Vif from the selector 110 and a sound band signal Sa from the selector 111 are supplied to an analog TV demodulation circuit 120. This analog TV demodulation circuit 120 is constituted by an LSI (large scale integrated circuit).

In the analog TV demodulation circuit 120, the picture IF signal Vif is fed to a multiplier 122 via an amplifier 121. The multiplier 122 multiplies the supplied picture IF signal by a frequency signal having the picture carrier frequency coming from a variable frequency oscillator 123. Although not shown, the variable frequency oscillator 123 is controlled by control signals from the host control section 130 in such a manner that the oscillation frequency of the oscillator 123 stays equal to the picture carrier frequency of the analog TV broadcast desired to be received.

A multiplication output signal from the multiplier 122 and the frequency signal from the variable frequency oscillator 123 are sent to a phase comparator 124. In turn, the phase comparator 124 generates a control signal reflecting the detected phase error between the two inputs and feeds the generated control signal to the variable frequency oscillator 123. These arrangements constitute a phase-locked loop (PLL).

In the PLL, the variable frequency oscillator 123 is controlled to output its frequency signal in synchronism with the picture carrier frequency. As a result, the multiplier 122 provides a baseband signal obtained by converting the picture carrier frequency of the picture IF signal Vif resulting from VSB demodulation into the baseband.

The baseband signal of the picture signal passes through a low-pass filter 125 that removes unnecessary signal components and is output by the analog TV demodulation circuit 120 as its output picture signal. This output picture signal is supplied to a video processor 131.

The video processor 131 performs color signal processing and other processes. The picture signal processed by the video processor 131 is fed to an LCD (liquid crystal display) panel 132 through an LCD panel driver, not shown. The picture signal is then output as a picture on the display screen of the LCD panel 132.

Meanwhile, the sound band signal Sa from the selector 111 is sent to a multiplier 127 via an amplifier 126 in the analog TV demodulation circuit 120. The frequency signal of the sound carrier frequency from a variable frequency oscillator 128 is also fed to the multiplier 127 and multiplied therein by the sound band signal Sa. Although not shown, the variable frequency oscillator 128 is controlled by control signals from the host control section 130 in such a manner that the oscillation frequency of the oscillator 128 stays equal to the sound carrier frequency of the analog TV broadcast desired to be received. The variable frequency oscillator 128, controlled in frequency by the control signal coming from the phase comparator 124, outputs the frequency signal in synchronism with the sound carrier frequency.

In the manner outlined above, the multiplier 127 converts the sound band signal Sa into the sound signal on the 4 to 6 MHz band. The 4 to 6 MHz band sound signal from the multiplier 127 is submitted to a band-pass filter 129 for removal of unnecessary signal components. Thereafter the sound signal from the band-pass filter 129 is output to a sound demodulation circuit 133. The sound demodulation circuit 133, also constituted by an LSI, demodulates the input sound signal into sounds that are supplied to and output acoustically by speakers 134.

As mentioned above, the signal L' used in parts of France is configured such that the way its picture and sound carriers are assigned in inverse relation with each other in frequency as opposed to the carriers of the signals employed elsewhere. The reversed carrier assignments require having the SAW filters switched accordingly. A typical structure of a traditional receiving apparatus that takes these specificities into account is shown schematically in FIG. 11. The difference of the structure of FIG. 11 from that of FIG. 9 is that the VSB filter 106 for 6 MHz and the sound selection SAW filter 109 for 6 MHz are removed and replaced simply by a sound SAW filter 135 for the signal L'. For the related art regarding the present information, reference should be made to Japanese Patent Laid-Open No. 2006-191388.

SUMMARY OF THE INVENTION

As explained above, there are a plurality of signal bands along with different IF signal bands for the analog TV signals used all over the world. There also exist the signals such as L' of which the picture and sound carriers are assigned in inverse relation with each other in frequency as opposed to the carriers of the other signals as mentioned earlier.

Where the signals of these multiple broadcast systems are to be demodulated, it is necessary for traditional analog TV broadcast signal receiving apparatuses to switch their SAW filters in accordance with each of the broadcast systems involved. This has been a costly solution to the problem of the coexisting multiple signal systems. It has been difficult to devise an apparatus capable of receiving and demodulating all analog TV broadcasts the world over.

The present invention has been made in view of the above circumstances and provides an analog TV broadcast signal receiving apparatus capable of receiving and demodulating the analog TV broadcast signals anywhere in the world.

In carrying out the present invention and according to one embodiment thereof, there is provided an analog TV broadcast signal receiving apparatus including: a tuner section configured to convert an analog TV broadcast signal into a predetermined intermediate frequency band signal; a demodulation circuit section configured to obtain a picture output signal and a sound intermediate frequency signal from the predetermined intermediate frequency band signal coming from the tuner section; a picture processing circuit section configured to convert the picture output signal into a display-ready picture signal; a sound demodulation processing circuit section configured to demodulate the sound intermediate frequency signal; and a control section; wherein the demodulation circuit section includes: an A/D conversion section configured to convert the predetermined intermediate frequency band signal coming from the tuner section into an intermediate frequency band digital signal; a complex frequency conversion section configured to convert the intermediate frequency band digital signal into a baseband frequency band digital signal by multiplying the intermediate frequency band digital signal coming from the A/D conversion section by a frequency signal coming from a complex variable frequency oscillator; a variable band limitation filter configured to band-limit the digital signal output by the complex frequency conversion section; a picture/sound separation section configured to have a picture/sound separation filter section, the picture/sound separation section being further configured to separate the digital signal coming from the variable band limitation filter into a picture signal band digital signal and a sound signal band digital signal; a VSB (vestigial sideband) filter configured to demodulate the picture signal band digital signal coming from picture/sound separation section into a picture signal component; a first digital-to-analog conversion section configured to convert a digital signal from the VSB filter into an analog picture signal before feeding the analog picture signal to the picture processing circuit section; and a second digital-to-analog conversion section configured to convert the sound signal band digital signal coming from the picture/sound separation filter section into an analog sound signal before supplying the analog sound signal to the sound demodulation processing circuit section; the control section includes a storage section configured to store a plurality of sets of a control signal for controlling the complex variable frequency oscillator in oscillation frequency, a filter coefficient for the variable band limitation filter, a filter coefficient for the picture/sound separation filter section, and a filter coefficient for the VSB filter with regard to each of a plurality of TV broadcasts; and when settings are input to receive selectively a TV broadcast, the control section retrieves from the storage section the set of the control signal and of the filter coefficients corresponding to the selected TV broadcast and feeds the retrieved set to the sections involved.

In the above-outlined structure of the analog TV broadcast signal receiving apparatus according to the invention, the demodulation circuit section converts the picture and sound signals on the intermediate frequency signal band altogether into a digital signal. The digital signal is turned into a baseband signal through complex frequency conversion. Following the frequency conversion, the signal is submitted to the variable band limitation filter for removal of unnecessary band components. The signal past the variable band limitation filter is separated by the picture/sound separation filter section into a picture signal band digital signal and a sound signal band digital signal.

The picture signal band digital signal is fed to the VSB filter for demodulation of the picture signal component into an analog picture signal. The analog picture signal is then sent to the picture processing circuit section for conversion into a display-ready picture signal. The sound signal band digital signal is supplied to the sound demodulation processing circuit section for demodulation into sounds.

According to the analog TV broadcast signal receiving apparatus of the present invention, it is possible to switch the frequency of the complex frequency conversion section for frequency conversion as well as the filter coefficients for the variable band limitation filter and for the picture/sound separation filter section in accordance with the TV broadcast selected to be received.

That is, the inventive analog TV broadcast signal receiving apparatus is different structurally from traditional setups in which a plurality of SAW filters are provided to address diverse TV broadcasts and are switched in accordance with the selected TV broadcast to be received. The analog TV broadcast signal receiving apparatus of the invention need only switch the signal frequency for frequency conversion as well as the filter coefficients in keeping with the analog TV broadcast to be received.

The inventive analog TV broadcast signal receiving apparatus is capable of demodulating picture and sound signals without recourse to a plurality of SAW filters. Because the same demodulation circuit can be used in different geographical regions adopting different TV broadcast systems, significant cost savings are accomplished in manufacturing the receiving apparatus. According to an embodiment of the present invention, as outlined above, the analog TV broadcast signal receiving apparatus can demodulate a plurality of analog TV broadcast signals used all over the world using an inexpensive structure free of SAW filters.

BRIEF DESCRIPTION OF THE DRAWINGS

Further advantages of the present invention will become apparent upon a reading of the following description and appended drawings in which:

FIG. 1 is a block diagram showing a typical structure of an analog TV broadcast signal receiving apparatus practiced as one embodiment of the present invention;

FIGS. 2A, 2B, 2C and 2D are schematic views explanatory of how the embodiment of the invention typically works during its demodulating process;

FIGS. 8A and 8B are schematic views showing how the embodiment of this invention converts the IF signal upon receipt of the signal L' into a complex baseband signal;

DETAILED DESCRIPTION OF THE PREFERRED EMBODIMENTS

The preferred embodiments of the analog TV broadcast signal receiving apparatus according to the present invention will now be described in reference to the accompanying drawings.

Figure 11:
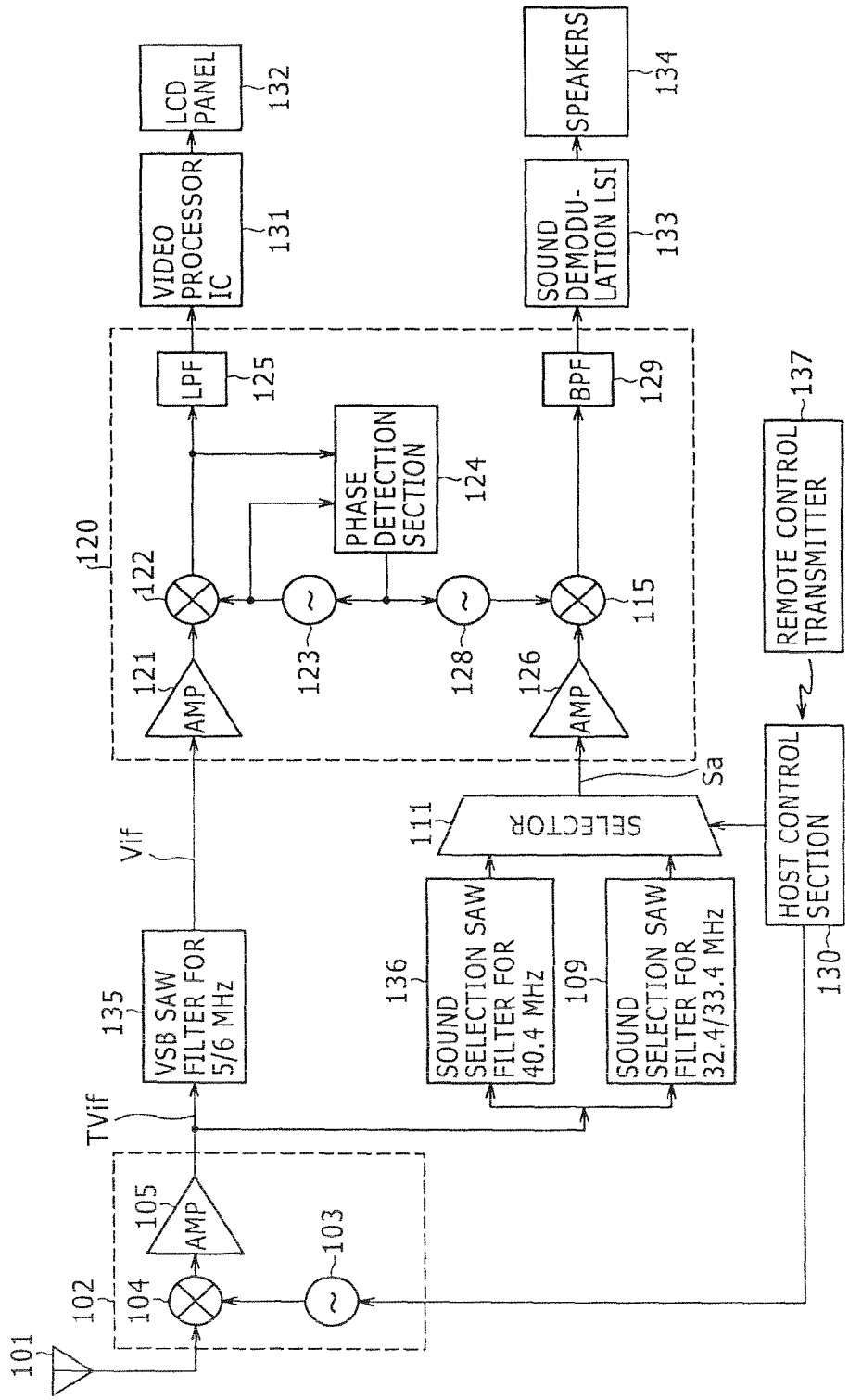
FIG. 11 is a block diagram showing a typical structure of an analog TV signal receiving apparatus capable of demodulating the signal L' used in Europe.

A Typical Hardware Structure of One Analog TV Broadcast Signal Receiving Apparatus Embodying the Invention FIG. 1 is a block diagram showing a typical structure of an analog TV broadcast signal receiving apparatus practiced as one embodiment of the present invention. In FIG. 1 as well as in FIGS. 9 and 11 mentioned earlier, like reference numerals denote like or corresponding parts. For example, an RF tuner section 102, a video processor 131, an LCD panel 132, a sound demodulation circuit 133, and speakers 134 are structurally the same as their counterparts shown in FIGS. 9 and 11.

Figure 9:
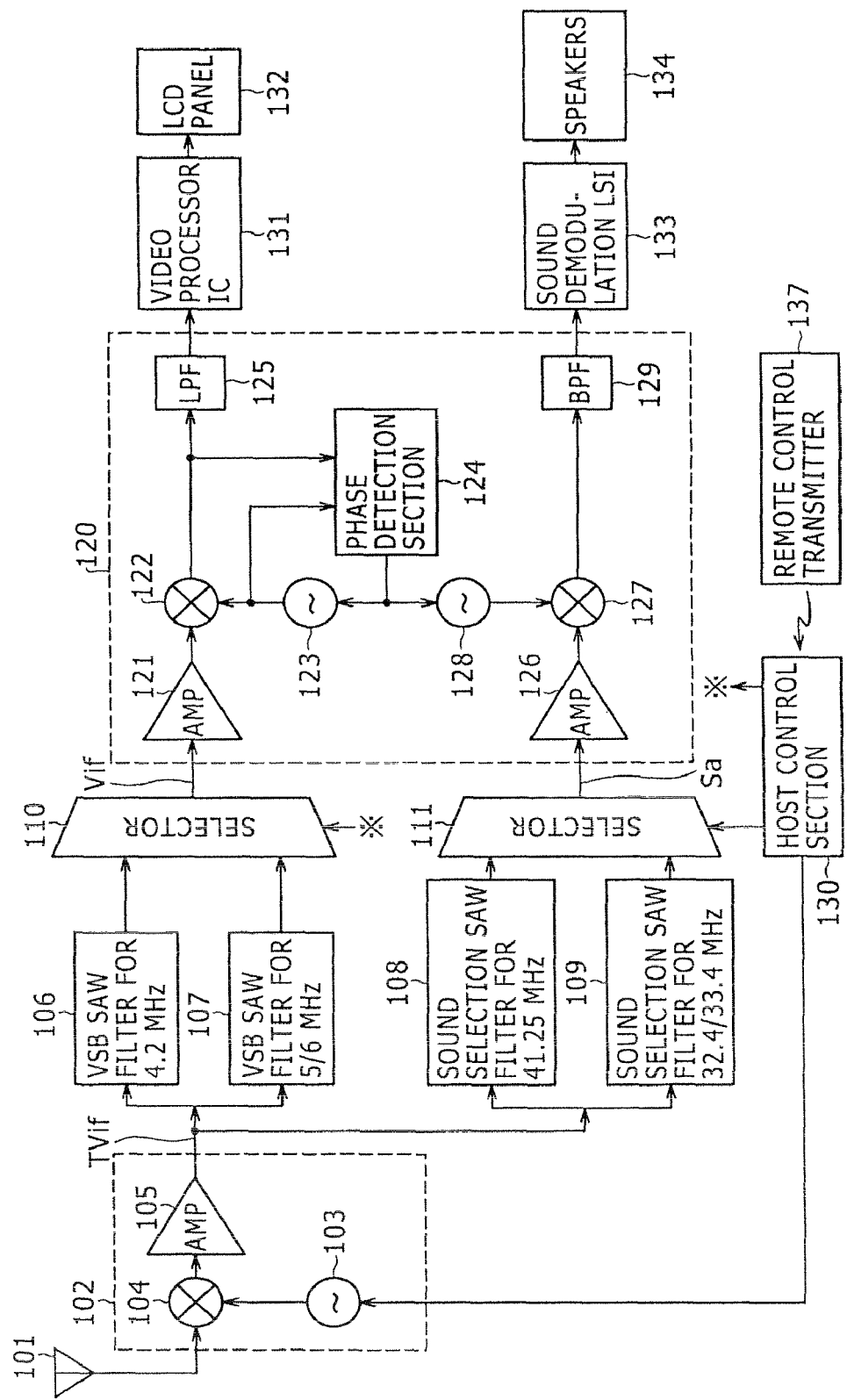
FIG. 9 is a block diagram showing a typical structure of an ordinary analog TV broadcast signal receiving apparatus designed for use mainly in the United States and in the European Union.

The embodiment of FIG. 1 is free of SAW filters 106 through 109, selectors 110 and 111, and an analog TV demodulation circuit 120 indicated in FIG. 9. Instead, the embodiment of FIG. 1 includes a digital demodulation circuit section 200 that may be constituted by a single-chip IC (integrated circuit) arrangement.

The digital demodulation circuit section 200 serves as an analog TV broadcast signal demodulating apparatus of the present invention. Illustratively, the digital demodulation circuit section 200 includes a demodulation circuit control section 200 having a microprocessor capability and a setting data memory 221 for holding the setting data about various analog TV broadcast systems. Preset in the setting data memory 221 are varieties of setting data such as the control signal for a variable frequency oscillator 203 (to be discussed later) and the control signals (filter coefficients) for the filter section in conjunction with each of the diverse analog TV broadcast systems.

The host control section 130 is capable of controlling the entire receiving apparatus embodying the invention, in such a manner that each of the analog TV broadcast systems with their settings registered illustratively by an operator is suitably dealt with. The host control section 130 notifies a demodulation circuit control section 220 of a control command identifying one of the analog TV broadcast systems of which the registered settings have been selected.

Given such a control command from the host control section 130, the demodulation circuit control section 220 retrieves the setting data of the selected analog TV broadcast system from the setting data memory 221. The retrieved setting data is forwarded to the relevant sections of the apparatus, as will be discussed later.

Alternatively, the demodulation circuit control section 220 need not be installed. Instead, the host control section 130 may be furnished with the setting data memory 221. Using what is held in the setting data memory 221, the host control section 130 may establish the settings of a given analog TV broadcast system with the digital demodulation circuit section 200.

In this embodiment of the invention, the IF signal TVif from the RF tuner 102 is forwarded to the digital demodulation circuit section 200. The IF signal TVif is first converted by an A/D conversion section 201 into a digital signal which is then sent to a complex multiplier 202. The complex variable frequency oscillator 203 supplies the complex multiplier 202 with two frequency signals (not shown) such that their phases are positioned perpendicular to each other. The two frequency signals coming from the complex variable frequency oscillator, with their phases intersecting at right angles, will not be discussed further for purpose of simplification.

The complex multiplier 202 provides a digital signal (complex baseband signal) C1 as the result of having the IF signal TVif frequency-converted to the baseband frequency band. It should be noted that in FIG. 1, two parallel lines represent a complex signal. However, the oscillation frequency signal coming out of the complex variable frequency oscillator 203 is indicated by a single line for purpose of simplification. These conventions will hold for the ensuing description.

The demodulation circuit control section 220 supplies the complex variable frequency oscillator 203 with a control signal such that the complex oscillation frequency signal of the oscillator 203 has a frequency for frequency-converting the IF signal TVif of the selected analog TV broadcast system into the baseband frequency band.

The complex baseband signal C1 from the complex multiplier 202 is fed to a variable band low-pass filter 204 for band limitation whereby unnecessary frequency components are removed. At this point, the demodulation circuit control section 220 reads a suitable control signal from the setting data memory 221 and supplies the variable band low-pass filter 204 therewith, the control signal being such as to control the filter 204 to limit the band corresponding to the selected analog TV broadcast system.

The variable band low-pass filter 204 is constituted by a finite impulse response (FIR) digital filter or an infinite impulse response (IIR) digital filter. For this reason, the control signal representing the setting data is made up of a filter coefficient. The filter structure and the control signals representative of the setting data regarding the filter 204 in the digital demodulation circuit section 200 will also hold for description that follows.

A complex baseband signal C2 having undergone band limitation by the variable band low-pass filter 204 is sent to a picture/sound separation section 205. In this example, the picture/sound separation section 205 is constituted by a frequency conversion section for frequency-converting the complex baseband signal C2 and by a variable band picture/sound separation filter 209.

The frequency conversion section for frequency-converting the complex baseband signal C2 provides preprocessing prior to the separation of the signal into a picture signal component and a sound signal component by the variable band picture/sound separation filter 209. The picture signal component or the sound signal component is frequency-converted into a predetermined frequency band. The frequency conversion section is made up of circuits for frequency-converting the picture signal component into the predetermined frequency band in such a manner that the picture carrier frequency is shifted to zero (DC).

The frequency conversion section of this example for shifting the picture carrier frequency to zero (DC) is formed by a complex multiplier 206, a complex variable frequency oscillator 207 that supplies the complex multiplier 206 with a complex frequency signal, and a phase detection section 208.

The phase detection section 208 compares in phase the picture carrier of a complex baseband signal C3 from the complex multiplier 206 with the target frequency f=0. Based on the result of the comparison, the phase detection section 208 gives an output that controls the oscillation frequency of the complex variable frequency oscillator 207. That is, the complex multiplier 206, complex variable frequency oscillator 207, and phase detection section 208 make up a PLL (phase-locked loop). In the PLL, the oscillation frequency of the complex variable frequency oscillator 207 is controlled to be equal to, and in phase with, the picture carrier frequency. It follows that the complex baseband signal C3 from the complex multiplier 206 is a signal in which the picture carrier frequency is shifted to zero.

The demodulation circuit control section 220 reads from the setting data memory 221 a control signal for using a free-running center frequency of the complex variable frequency oscillator 207 as the picture carrier frequency corresponding to the selected analog TV broadcast system. The demodulation circuit control section 220 supplies the retrieved control signal to the complex variable frequency oscillator 207.

The complex baseband signal C3 from the complex multiplier 206 is fed to the variable band picture/sound separation filter 209. In turn, the variable band picture/sound separation filter 209 separates the complex baseband signal C3 into a picture signal component and a sound signal component, as will be discussed later.

Figure 10A:
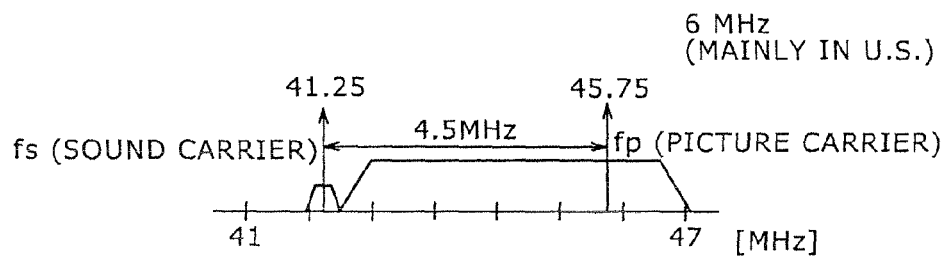
FIGS. 10A, 10B and 10C are schematic views explanatory of the frequency bands of various analog TV broadcast signals used primarily in the United States and in the European Union.
Figure 10B:
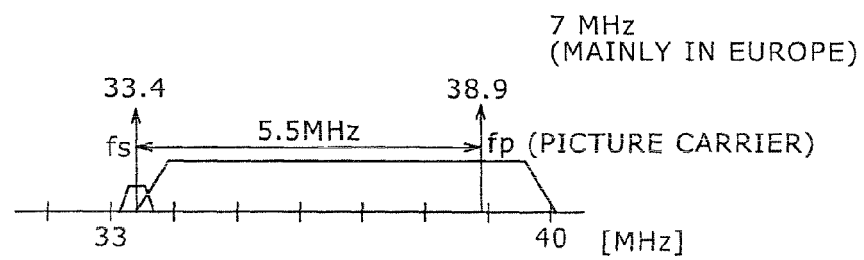
Figure 10C:
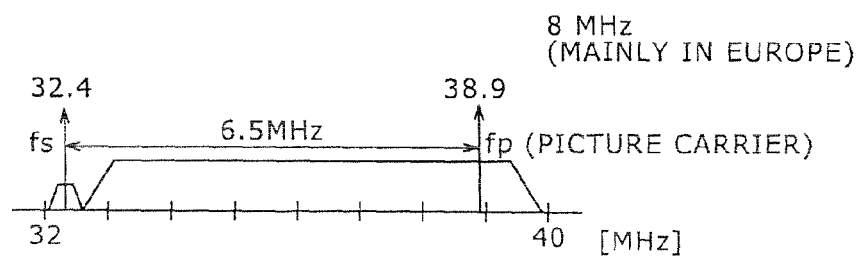

Before a detailed explanation is made of the variable band picture/sound separation filter 209, the workings upstream of the filter 209 are described below using specific examples. Suppose now that the IF signal on the 6 MHz band shown in FIG. 10A, used mainly in the United States, is input to the digital demodulation circuit section 200.

The digital demodulation circuit section 200 of this embodiment converts the IF signal TVif into a digital signal for complex signal treatment. The complex multiplier 202 converts the IF signal TVif into a digital signal using a complex oscillation frequency signal coming from the complex variable frequency oscillator 203. At this point, the frequency of the complex oscillation frequency signal from the complex variable frequency oscillator 203 is set to 44 MHz under control by the control signal from the demodulation circuit control section 220. The digital signal of the IF signal TVif is multiplied by the frequency of the complex variable frequency oscillator 203 for conversion into the complex baseband signal C1.

What takes place at this point is illustrated in FIGS. 2A and 2B. The IF signal TVif having a negative frequency is multiplied by the complex oscillation frequency signal at 44 MHz for frequency conversion. The multiplication provides the complex baseband signal C1 shown in FIG. 2B.

The complex baseband signal C1 shown in FIG. 2B is sent to the variable band low-pass filter 204 for band limitation whereby the complex baseband signal C2 indicated in FIG. 2C is obtained. In this example, as shown in FIG. 2C, the variable band low-pass filter 204 is controlled by the control signal from the demodulation circuit control section 220 in a manner band-limiting the input signal to a bandwidth of ±3 MHz.

The complex band signal C2 shown in FIG. 2C is fed to the complex multiplier 206 of the frequency conversion section for frequency conversion wherein the picture carrier frequency is reproduced in the PLL. The frequency conversion converts the complex baseband signal C2 into the complex baseband signal C3 in which the picture carrier frequency is shifted to zero (DC) as shown in FIG. 2D.

The variable band picture/sound separation filter 209 will now be explained. In this example, the variable band picture/sound separation filter 209 extracts the sound signal component (i.e., sound carrier component) from the complex baseband signal C3, and subtracts the extracted sound signal component from the complex baseband signal C3 to acquire the picture signal component only.

Figure 3:
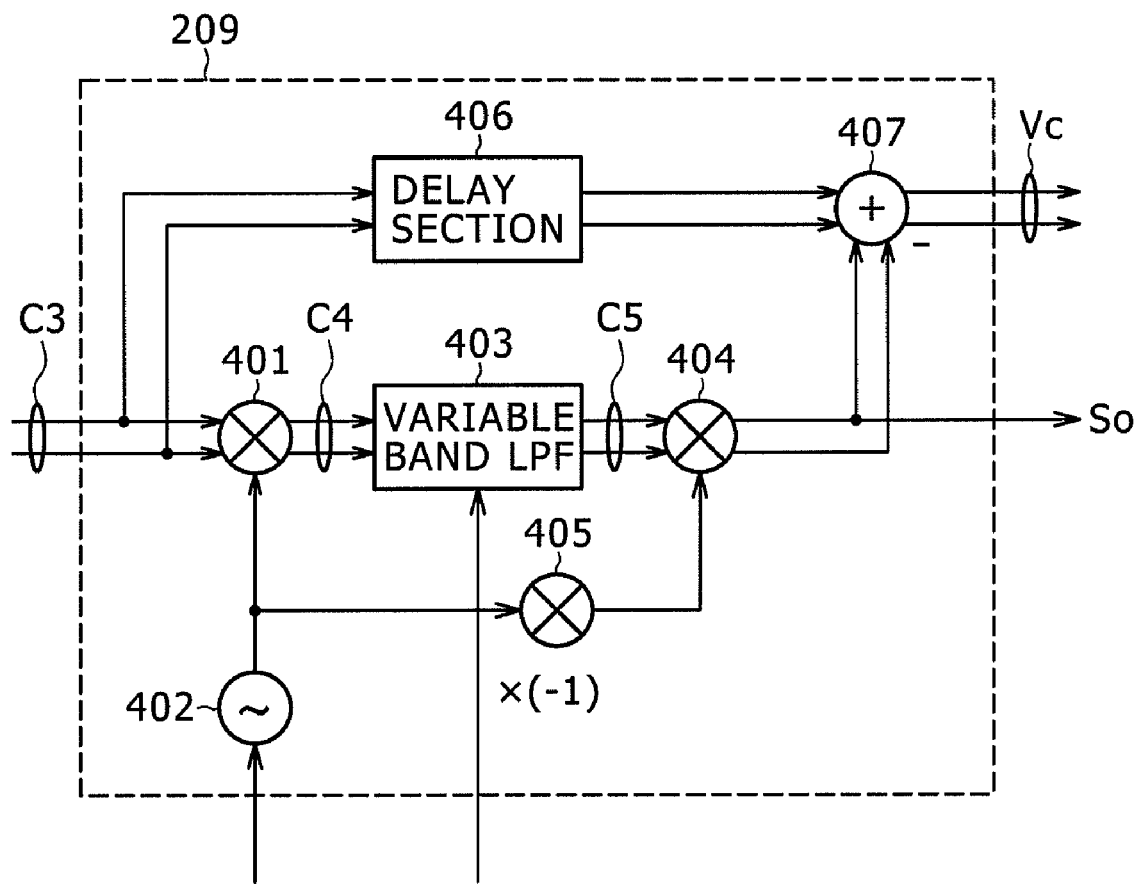
FIG. 3 is a block diagram showing a typical structure of a variable band picture/sound separation filter used by the embodiment of this invention.

FIG. 3 shows a detailed typical structure of the variable band picture/sound separation filter 209. The complex baseband signal C3 from the complex multiplier 206 is fed to a complex multiplier 401. In the complex multiplier 104, the complex baseband signal C3 is multiplied by a complex oscillation frequency signal of the sound carrier frequency from a complex variable frequency oscillator 402. Following the multiplication, the complex multiplier 401 provides a complex baseband signal C4 in which the sound carrier frequency is shifted to zero (DC).

At this point, the demodulation circuit control section 220 reads from the setting data memory 221 a control signal for using a free-running center frequency of the complex variable frequency oscillator 402 as the sound carrier frequency corresponding to the selected analog TV broadcast system. The demodulation circuit control section 220 supplies the retrieved control signal to the complex variable frequency oscillator 402.

The complex baseband signal C4 from the complex multiplier 401 is fed to a variable band low-pass filter 403 for band limitation whereby unnecessary frequency components are removed from the signal C4. As a result, the variable band low-pass filter 403 produces a complex baseband signal C5 made up of solely the sound signal component, with the sound carrier frequency shifted to zero. At this point, the demodulation circuit control section 220 reads from the setting data memory 221 a control signal for limiting the bandwidth corresponding to the selected analog TV broadcast system. The demodulation circuit control section 220 supplies the retrieved control signal to the variable band low-pass filter 403.

The complex baseband signal C5 obtained by the variable band low-pass filter 403 through band limitation is supplied to a complex multiplier 404 serving as a frequency conversion section for returning the sound carrier frequency to the original frequency. The complex oscillation frequency signal from the complex variable frequency oscillator 402 is multiplied by the value "−1" in a multiplier 405. Following the multiplication by the multiplier 405, the resulting signal is forwarded to the complex multiplier 404 as the signal for use in frequency conversion.

In turn, the complex multiplier 404 produces a complex baseband signal formed solely by the sound signal component in which the sound carrier frequency is returned to the original frequency. An output sound signal component So that is the real signal component of the complex baseband signal comes out as the output of the variable band picture/sound separation filter 209.

Furthermore, the complex baseband signal formed solely by the sound signal component from the complex multiplier 404 is sent to a complex subtractor 407. The complex subtractor 407 is also supplied with the complex baseband signal C3 from the complex multiplier 206 through a delay circuit 406. The delay circuit 406 delays the complex baseband signal C3 by the time it takes to extract the sound signal component mentioned above.

The complex subtractor 407 subtracts from the complex baseband signal C3 the complex baseband signal formed only by the sound signal component from the complex multiplier 403, thereby producing a picture signal component Vc.

Described below in reference to FIGS. 4A through 4E is how the variable band picture/sound separation filter 209 works when the above-mentioned IF signal on the 6 MHz band used mainly in the United States is input to the digital demodulation circuit section 200.

Figure 4A:
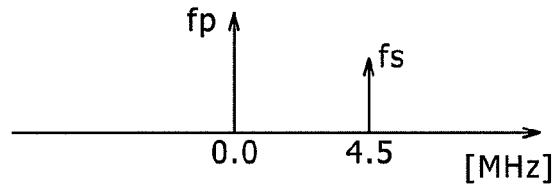
FIGS. 4A, 4B, 4C, 4D and 4E are schematic views explanatory of how the variable band picture/sound separation filter of FIG. 3 typically works.
Figure 4B:
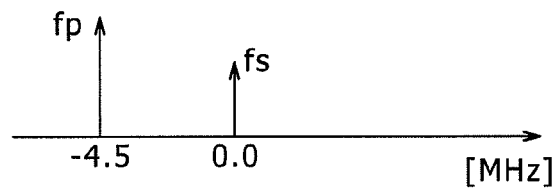

As already indicated in FIG. 2D, the complex baseband signal C3 input to the variable band picture/sound separation filter 209 behaves as shown in FIG. 4A. The complex baseband signal C3 is frequency-converted by the complex multiplier 401 into the complex baseband signal C4 in which the sound carrier frequency is shifted to zero as shown in FIG. 4B. At this point, the oscillation frequency of the complex variable frequency oscillator 402 is controlled to be 4.5 MHz by the demodulation circuit control section 220 of this example.

Figure 4C:
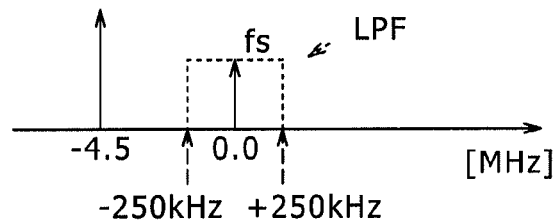

The complex baseband signal C4 from the complex multiplier 401 is sent to the variable band low-pass filter 403 for carrying out band limitation in a manner shown in FIG. 4C. The band limiting process produces the complex baseband signal C5 made up of solely the sound signal component. In this example, as shown in FIG. 4C, the bandwidth of the variable band low-pass filter 403 is controlled to be ±250 kHz by the demodulation circuit control section 220.

Figure 4D:
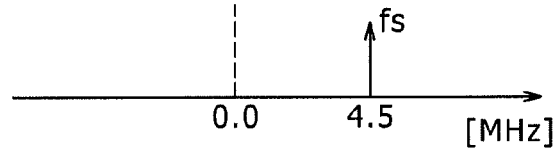

The complex baseband signal C5 is then frequency-converted by the complex multiplier 404 as shown in FIG. 4D, with the sound carrier frequency returned to 4.5 MHz in this example. The output sound signal component So is thus obtained from the complex multiplier 404.

Figure 4E:
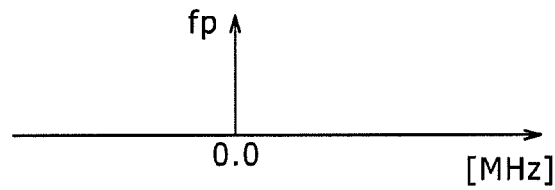

Finally, the complex subtractor 407 subtracts from the complex baseband signal C3 the complex baseband signal made up of solely the sound signal component from the complex multiplier 404. The subtracting process provides the picture signal component Vc formed only by the picture signal component, as shown in FIG. 4E.

In the manner described above, the complex baseband component Vc formed only by the picture signal component from the variable band picture/sound separation filter 209 is sent to a variable band VSB filter 210 whereby the picture signal component is demodulated. At this point, the demodulation circuit control section 220 reads from the setting data memory 221 the control signal (i.e., filter coefficient) corresponding to the selected analog TV broadcast system, and sends the retrieved control signal to the variable band VSB filter 210.

Figures 5, 6:
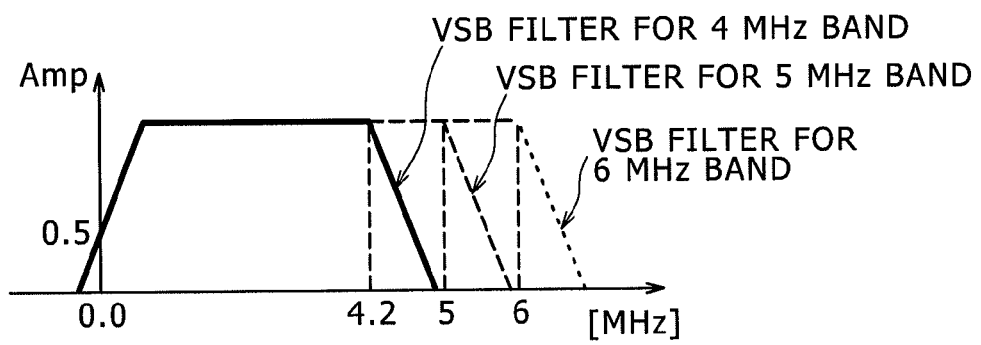
FIG. 5 is a graphic representation showing typical frequency characteristics of variable band VSB filters used by the embodiment of this invention.
FIG. 6 is a tabular view showing typical setting data about various analog TV broadcast signals used by the embodiment of this invention.

FIG. 5 is a graphic representation showing typical frequency characteristics of VSB filters for the picture bands of 4 MHz, 5 MHz and 6 MHz with regard to the analog TV signal bandwidths of 6 MHz, 7 MHz, and 8 MHz respectively. The variable band VSB filter 210 is controlled by the demodulation circuit control section 220 using the filter coefficient representing one of these filter characteristics.

The digital picture signal from the variable band VSB filter 210 is fed to a D/A (digital to analog) conversion section 211 for conversion into an analog picture signal. The resulting analog picture signal is then output by the digital demodulation circuit section 200. As with the traditional setup discussed above, the picture signal from the digital demodulation circuit section 200 is fed to the video processor 131 and output as a picture on the display screen of the LCD panel 132.

The sound signal component So from the variable band picture/sound separation filter 209 is converted by a D/A conversion section 212 into an analog sound signal. The resulting analog sound signal is then output by the digital demodulation circuit section 200. As with the traditional setup discussed above, the sound signal from the digital demodulation circuit section 200 is supplied to the sound demodulation circuit 133 and reproduced acoustically by the speakers 134.

The Workings of the Digital Demodulation Circuit Section 200 of the Embodiment

Below is a description of how the digital demodulation circuit section 200 of this embodiment works when the analog TV signal on the 6 MHz band is received. Given a control command from the host control section 130, the demodulation circuit control section 220 sends the setting data necessary for modulating the 6 MHz band signal to the relevant sections of the digital demodulation circuit section 200 discussed above. Each of the sections involved is set as follows:

Setting P1: The complex variable frequency oscillator 203 is set to oscillate at a complex oscillation frequency of +44 MHz so as to convert the IF signal into the complex baseband signal C1. In this case, the oscillator 203 is set so that the picture carrier frequency following the frequency conversion becomes −1.75 MHz.

Setting P2: The variable band low-pass filter 204 is set with the filter coefficient for attaining the low-pass filter characteristic of ±3 MHz.

Setting P3: The complex variable frequency oscillator 402 in the variable band picture/sound separation filter 209 is set to oscillate at a complex oscillation frequency of −4.5 MHz so as to convert the sound carrier into the baseband.

Setting P4: The variable band low-pass filter 403 in the variable band picture/sound separation filter 209 is set with the filter coefficient for attaining the low-pass filter characteristic of about ±250 kHz.

Setting P5: The variable band VSB filter 210 is set with the filter coefficient for attaining the VSB filter characteristic for the picture band at 4 MHz.

When the above settings are completed, the digital demodulation circuit section 200 performs its demodulation operations in eight steps (1) through (8) described below.

(1) The IF signal shown in FIG. 2A is converted by the A/D conversion section 201 into digital data.

(2) The IF signal in digital form is fed to the complex multiplier 202 for complex multiplication wherein the IF signal is multiplexed by the complex oscillation frequency signal with the complex frequency of +44 MHz coming from the complex frequency oscillator 203. The complex multiplier 202 thus converts the IF into the complex baseband signal C1 such as one shown in FIG. 2B. In this example, the negative IF signal is multiplied by the complex oscillation frequency signal of +44 MHz and thereby shifted into the complex baseband range.

(3) The variable band low-pass filter 204 for ±3 MHz is then set to turn the complex baseband signal C1 into the complex baseband signal C2 devoid of unnecessary signals such as those of adjacent channels, as shown in FIG. 2C.

(4) In the PLL made up of the complex multiplier 206, complex variable frequency oscillator 207, and phase detection section 208, the complex variable frequency oscillator 207 works to output a complex oscillation frequency signal in synchronism with the picture carrier (−1.75 MHz). This converts the complex baseband signal C2 into the complex baseband signal C3 in which the picture carrier is accurately shifted to zero (DC) in frequency, as shown in FIG. 2D.

(5) The variable band picture/sound separation filter 209 proceeds to separate the picture and sound signals as discussed above. Specifically, the complex variable frequency oscillator 402 oscillates at a complex frequency of −4.5 MHz so as to extract only the sound signal from the complex baseband signal C3 in which the picture and sound signals are mixed. The complex multiplier 401 multiplies the complex baseband signal C3 by the complex oscillation frequency signal of −4.5 MHz, thus converting the sound signal into the baseband. This sound signal is free of the picture signal that has been removed by the variable band low-pass filter 403 from the high frequency range.

Devoid of the picture signal, the sound signal is fed to the complex multiplier 404 and multiplied therein by the complex frequency of +4.5 MHz. The sound signal is thus returned to the original frequency of +4.5 MHz. A real part signal So of this sound signal is output to the outside for sound processing.

Meanwhile, the complex baseband signal C3 in which the picture and sound signals are mixed is input to the delay circuit 406 for a delay allowing for the time it takes to extract the sound signal. The complex baseband signal C3 thus delayed is forwarded to the complex subtractor 407. The complex subtractor 407 subtracts the sound signal component returned to the frequency of +4.5 MHz from the delayed complex baseband signal C3. The subtraction produces solely the picture signal component Vc free of the sound signal component. The picture signal component Vc is sent to the variable band VSB filter 210.

(6) The variable band VSB filter 210 selects the VSB filter for the picture band of 4 MHz of which the characteristic is indicated by solid lines in FIG. 5. The picture signal component Vc, having undergone VSB demodulation, is output to the D/A conversion section 211.

(7) The D/A conversion section 211 converts the demodulated picture signal in digital form into an analog signal which is then output to the video processor 131 located downstream.

The subsequent processes are the same as those of the traditional analog TV demodulation described earlier.

(8) The D/A conversion section 212 converts into an analog sound signal the digital sound signal So coming from the variable band picture/sound separation filter, and forwards the analog sound signal to the sound demodulation circuit 133 located downstream. The subsequent processes are the same as those of the traditional analog TV demodulation.

The foregoing paragraphs have described the processes in which to receive the analog TV signal on the 6 MHz band. For each of the other analog TV signals on the 7 MHz and 8 MHz bands, the settings P1 through P5 described above may be modified accordingly for suitable demodulation.

FIG. 6 shows typical setting data corresponding to the above-described settings P1 through P5 for receiving the analog TV signals on the 6 MHz, 7 MHz, and 8 MHz bands. The values listed in FIG. 6 are for explanation purposes and may vary depending on the frequency assignments of the picture and sound carriers in the IF signal, on the circuits to be implemented, and on the clock signals to be used.

Processing Involved with the Signal L'

Figure 7A:
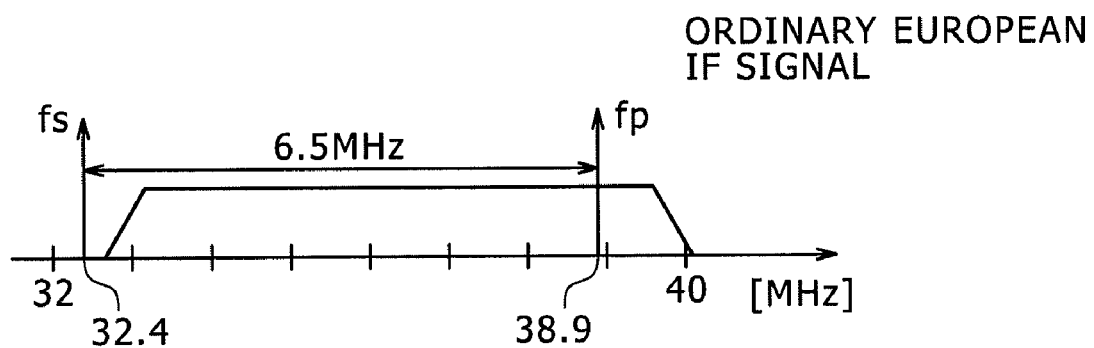
FIGS. 7A and 7B are schematic views explanatory of the IF signal in effect when the signal L' is received.
Figure 7B:
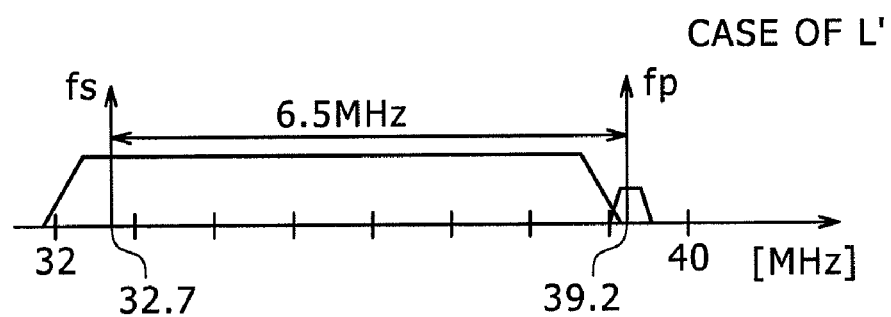

What follows is a description of how the so-called signal L' is demodulated by the digital demodulation circuit section 200 of this embodiment, the signal L' being a signal in which the sound carrier is assigned a higher frequency than the picture carrier. FIGS. 7A and 7B show how the IF signal behaves. More specifically, FIG. 7A indicates the IF signal for the ordinary analog TV broadcast signal used in Europe. FIG. 7B depicts the IF signal for use with the signal L'.

In the case of the signal L', the IF signal TVif coming from the RF tuner 102 has the carrier signal assignments shown in FIG. 7B. When the signal L' is to be demodulated, a setting command from the host control section 130 causes the demodulation circuit control section 220 to set suitably the relevant sections in the digital demodulation circuit section 200 using the setting data kept in the setting data memory 221. The settings necessary for demodulating the signal L' are listed in FIG. 6.

The settings needed to demodulate the signal L' are the same as those for demodulating the ordinary signal on the 8 MHz band except for the complex frequency set on the complex variable frequency oscillator 203 for converting the IF signal TVif into the complex baseband signal C1. That is, the complex oscillation frequency of the complex variable frequency oscillator 203 is set to +36.15 MHz for demodulating the ordinary 8 MHz band signal and to −35.45 MHz for demodulating the signal L'. The remaining settings are the same for the two signals.

What is carried out by the digital demodulation circuit section 200 in demodulating the signal L' is described below.

(1) The IF signal shown in FIG. 8A is converted into digital data by the A/D conversion section 201.

(2) The IF signal in digital form is sent to the complex multiplier 202 for complex multiplication by the complex oscillation frequency signal having the complex frequency of −35.45 MHz coming from the complex variable frequency oscillator 203. The complex multiplier 202 thus converts the digital IF signal into the complex baseband signal C1 shown in FIG. 8B.

Where the ordinary 8 MHz band signal is to be demodulated, the negative IF signal is multiplied by the complex oscillation frequency signal at +36.15 MHz and thereby shifted into the complex baseband range. In the case of the signal L', the positive IF signal is multiplied by the complex oscillation frequency signal at −35.45 MHz and thereby shifted into the complex baseband range. The subsequent processes are the same as those of the demodulation of the 8 MHz band signal.

That is, the digital demodulation circuit section 200 of this embodiment is capable of handling both positive and negative complex frequencies because the section 200 deals with signals through complex frequency processing. For this reason, if the frequency assignments of the picture and sound carriers are found to be changed, the complex variable frequency oscillator 203 need only be switched in oscillation frequency accordingly to address the change. Upon conversion into the complex baseband, it is possible for the embodiment to handle different picture and sound frequency assignments in a unified manner. Unlike traditional circuits, there is no need to switch between the SAW filters dedicated for the signal L'.

Other Embodiments and Variations

In the foregoing description of the embodiment of the invention, the picture/sound separation section 205 was shown extracting the sound signal component from the complex baseband signal C2 and then subtracting the extracted sound signal component from the complex baseband signal so as to produce the picture signal component. Conversely, the picture/sound separation section 205 may be arranged to extract the picture signal component from the complex baseband signal C2 and to subtract the extracted picture signal component from the complex baseband signal in order to produce the sound signal component.

In the foregoing description of the embodiment, the digital demodulation circuit section 200 was shown furnished with the demodulation circuit control section 220 as well as the setting data memory 221. The digital demodulation circuit section 200 was shown to make the settings regarding various analog TV signals based on the control command from the host control section 130 and by resorting to the setting data memory 221. Alternatively, the setting data memory may be connected to the host control section 130 to let the section 130 carry out the function of the demodulation circuit control section 220. In this alternative example, there is no need to install the demodulation circuit control section 220 or the setting data memory in the digital demodulation circuit section 200.

The present application contains subject matter related to that disclosed in Japanese Priority Patent Applications JP 2008-089574 and JP 2008-195921 filed in the Japan Patent Office on Mar. 31, 2008 and Jul. 30, 2008, respectively, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An analog television broadcast signal receiving apparatus comprising:
   a tuner section configured to convert an analog television broadcast signal into a predetermined intermediate frequency band signal;
   a demodulation circuit section configured to obtain a picture output signal and a sound intermediate frequency signal from said predetermined intermediate frequency band signal coming from said tuner section;
   a picture processing circuit section configured to convert said picture output signal into a display-ready picture signal;

a sound demodulation processing circuit section configured to demodulate said sound intermediate frequency signal; and a control section;

wherein said demodulation circuit section includes analog-to-digital conversion means for converting said predetermined intermediate frequency band signal coming from said tuner section into an intermediate frequency band digital signal, complex frequency conversion means for converting said intermediate frequency band digital signal into a baseband frequency band digital signal by multiplying said intermediate frequency band digital signal coming from said analog-to-digital conversion means by a frequency signal coming from a complex variable frequency oscillator, a variable band limitation filter configured to band-limit the digital signal output by said complex frequency conversion means, picture/sound separation means for having picture/sound separation filter means, said picture/sound separation means being further configured to separate the digital signal coming from said variable band limitation filter into a picture signal band digital signal and a sound signal band digital signal, a vestigial sideband filter configured to demodulate said picture signal band digital signal coming from picture/sound separation means into a picture signal component, first digital-to-analog conversion means for converting a digital signal from said vestigial sideband filter into an analog picture signal before feeding said analog picture signal to said picture processing circuit section, and second digital-to-analog conversion means for converting said sound signal band digital signal coming from said picture/sound separation filter means into an analog sound signal before supplying said analog sound signal to said sound demodulation processing circuit section;

said control section includes a storage section configured to store a plurality of sets of a control signal for controlling said complex variable frequency oscillator in oscillation frequency, a filter coefficient for said variable band limitation filter, a filter coefficient for said picture/sound separation filter means, and a filter coefficient for said vestigial sideband filter with regard to each of a plurality of television broadcasts; and when settings are input to receive selectively a television broadcast, said control section retrieves from said storage section the set of said control signal and of said filter coefficients corresponding to the selected television broadcast and feeds the retrieved set to the sections involved, wherein said picture/sound separation means includes second complex frequency conversion means for frequency-converting the digital signal coming from said variable band limitation filter in such a manner that either a picture signal band component or a sound signal band component of said digital signal is turned into a predetermined frequency band, and said picture/sound separation filter means includes:

an extraction filter configured to extract either said picture signal band component or said sound signal band component coming from said second complex frequency conversion means following the frequency conversion; and subtraction means for subtracting either said picture signal band component or said sound signal band component extracted by said extraction filter from the digital signal supplied by said second complex frequency conversion means.

2. An analog television broadcast signal demodulating apparatus comprising:

analog-to-digital conversion means for converting into a digital signal an analog television broadcast signal following conversion into a predetermined intermediate frequency band signal;

complex frequency conversion means for converting said intermediate frequency band digital signal into a baseband frequency band digital signal by multiplying said intermediate frequency band digital signal coming from said analog-to-digital conversion means by a frequency signal coming from a complex variable frequency oscillator;

a variable band limitation filter configured to band-limit the digital signal output by said complex frequency conversion means;

picture/sound separation means for having picture/sound separation filter means, said picture/sound separation means being further configured to separate the digital signal coming from said variable band limitation filter into a picture signal band digital signal and a sound signal band digital signal;

a vestigial sideband filter configured to demodulate said picture signal band digital signal coming from picture/sound separation means into a picture signal component;

digital-to-analog conversion means for converting a digital signal from said vestigial sideband filter into an analog picture signal before feeding said analog picture signal to a picture processing circuit;

digital-to-analog conversion means for converting said sound signal band digital signal coming from said picture/sound separation filter means into an analog sound signal before supplying said analog sound signal to a sound demodulation processing circuit;

a storage section configured to store a plurality of sets of a control signal for controlling said complex variable frequency oscillator in oscillation frequency, a filter coefficient for said variable band limitation filter, a filter coefficient for said picture/sound separation filter means, and a filter coefficient for said vestigial sideband filter with regard to each of a plurality of television broadcasts; and a control section configured such that when settings are input to receive selectively a television broadcast, said control section retrieves from said storage section the set of said control signal and of said filter coefficients corresponding to the selected television broadcast and feeds the retrieved set to the sections involved, wherein said picture/sound separation means includes second complex frequency conversion means for frequency-converting the digital signal coming from said variable band limitation filter in such a manner that either said picture signal band component or said sound signal band component of said digital signal is turned into a predetermined frequency band, and said picture/sound separation filter means includes:

an extraction filter configured to extract either said picture signal band component or said sound signal band component coming from said second complex frequency conversion means following the frequency conversion; and subtraction means for subtracting either said picture signal band component or said sound signal band component extracted by said extraction filter from the digital signal supplied by said second complex frequency conversion means.

3. An analog television broadcast signal receiving apparatus comprising:

tuner means for converting an analog television broadcast signal into a predetermined intermediate frequency band signal;

demodulation circuit means for obtaining a picture output signal and a sound intermediate frequency signal from said predetermined intermediate frequency band signal coming from said tuner means;

picture processing circuit means for converting said picture output signal into a display-ready picture signal;

sound demodulation processing circuit means for demodulating said sound intermediate frequency signal; and control means;

wherein said demodulation circuit means includes analog-to-digital conversion means for converting said predetermined intermediate frequency band signal coming from said tuner means into an intermediate frequency band digital signal, complex frequency conversion means for converting said intermediate frequency band digital signal into a baseband frequency band digital signal by multiplying said intermediate frequency band digital signal coming from said analog-to-digital conversion means by a frequency signal coming from a complex variable frequency oscillator, a variable band limitation filter configured to band-limit the digital signal output by said complex frequency conversion means, picture/sound separation means for having picture/sound separation filter means, said picture/sound separation means being further configured to separate the digital signal coming from said variable band limitation filter into a picture signal band digital signal and a sound signal band digital signal, a vestigial sideband filter configured to demodulate said picture signal band digital signal coming from picture/sound separation means into a picture signal component, first digital-to-analog conversion means for converting a digital signal from said vestigial sideband filter into an analog picture signal before feeding said analog picture signal to said picture processing circuit means, and second digital-to-analog conversion means for converting said sound signal band digital signal coming from said picture/sound separation filter means into an analog sound signal before supplying said analog sound signal to said sound demodulation processing circuit means;

said control means includes a storage section configured to store a plurality of sets of a control signal for controlling said complex variable frequency oscillator in oscillation frequency, a filter coefficient for said variable band limitation filter, a filter coefficient for said picture/sound separation filter means, and a filter coefficient for said vestigial sideband filter with regard to each of a plurality of television broadcasts; and when settings are input to receive selectively a television broadcast, said control means retrieves from said storage section the set of said control signal and of said filter coefficients corresponding to the selected television broadcast and feeds the retrieved set to the sections involved, wherein said picture/sound separation means includes second complex frequency conversion means for frequency-converting the digital signal coming from said variable band limitation filter in such a manner that either said picture signal band component or a sound signal band component of said digital signal is turned into a predetermined frequency band, and said picture/sound separation filter section includes:

an extraction filter configured to extract either said picture signal band component or said sound signal band component coming from said second complex frequency conversion means following the frequency conversion; and subtraction means for subtracting either said picture signal band component or said sound signal band component extracted by said extraction filter from the digital signal supplied by said second complex frequency conversion means.

* * * * *